United States Patent
Li et al.

(10) Patent No.: US 8,341,226 B2
(45) Date of Patent: Dec. 25, 2012

(54) TECHNIQUES TO CONTROL ELECTRONIC MAIL DELIVERY

(75) Inventors: Hong Li, El Dorado Hill, CA (US); Don Meyers, Rescue, CA (US)

(73) Assignee: Intel Corporation, Santa Clara, CA (US)

(*) Notice: Subject to any disclaimer, the term of this patent is extended or adjusted under 35 U.S.C. 154(b) by 1133 days.

(21) Appl. No.: 11/377,331

(22) Filed: Mar. 15, 2006

(65) Prior Publication Data

US 2007/0220125 A1    Sep. 20, 2007

(51) Int. Cl.
    G06F 15/16    (2006.01)
(52) U.S. Cl. ......... 709/206; 709/203; 709/207; 709/225
(58) Field of Classification Search .................. 709/206, 709/225, 203, 207
    See application file for complete search history.

(56) References Cited

U.S. PATENT DOCUMENTS

| | | | | |
|---|---|---|---|---|
| 6,075,769 A * | 6/2000 | Ghanwani et al. | ............ | 370/229 |
| 7,181,764 B2 * | 2/2007 | Zhu et al. | ............ | 726/4 |
| 7,461,063 B1 * | 12/2008 | Rios | ............ | 1/1 |
| 7,469,292 B2 * | 12/2008 | Landsman et al. | ............ | 709/225 |
| 7,548,956 B1 * | 6/2009 | Aoki et al. | ............ | 709/207 |
| 7,664,957 B2 * | 2/2010 | Gentry et al. | ............ | 713/176 |
| 2002/0116348 A1 * | 8/2002 | Phillips et al. | ............ | 705/400 |
| 2004/0068527 A1 * | 4/2004 | Smith, III | ............ | 707/204 |
| 2004/0255122 A1 * | 12/2004 | Ingerman et al. | ............ | 713/176 |
| 2005/0097319 A1 * | 5/2005 | Zhu et al. | ............ | 713/166 |
| 2005/0114429 A1 * | 5/2005 | Caccavale | ............ | 709/200 |
| 2006/0031359 A1 * | 2/2006 | Clegg et al. | ............ | 709/206 |
| 2006/0059238 A1 * | 3/2006 | Slater et al. | ............ | 709/206 |
| 2006/0075048 A1 * | 4/2006 | Gruper et al. | ............ | 709/206 |
| 2006/0085506 A1 * | 4/2006 | Meyers et al. | ............ | 709/206 |
| 2006/0253584 A1 * | 11/2006 | Dixon et al. | ............ | 709/225 |
| 2006/0277259 A1 * | 12/2006 | Murphy et al. | ............ | 709/206 |
| 2006/0277591 A1 * | 12/2006 | Arnold et al. | ............ | 726/1 |
| 2007/0005702 A1 * | 1/2007 | Tokuda et al. | ............ | 709/206 |
| 2007/0038705 A1 * | 2/2007 | Chickering et al. | ............ | 709/206 |
| 2007/0067282 A1 * | 3/2007 | Prakash et al. | ............ | 707/5 |
| 2007/0088789 A1 * | 4/2007 | Berman | ............ | 709/206 |
| 2007/0143469 A1 * | 6/2007 | Adams et al. | ............ | 709/224 |

* cited by examiner

*Primary Examiner* — Duyen Doan
(74) *Attorney, Agent, or Firm* — Kacvinsky Daisak PLLC (57) ABSTRACT

Techniques to manage electronic mail delivery may be described. An apparatus may include an internal message transfer agent to determine a message flow rate for an external message transfer agent based on a trust value associated with the external message transfer agent. Other embodiments are described and claimed.

6 Claims, 7 Drawing Sheets

TECHNIQUES TO CONTROL ELECTRONIC MAIL DELIVERY

CROSS REFERENCE TO RELATED APPLICATION

This application is related to U.S. patent application Ser. No. 10/965,170 titled "Controlling Receipt of Undesired Electronic Mail" and filed on Oct. 14, 2004.

BACKGROUND

Message transfer agents are programs responsible for delivering electronic mail messages. Upon receiving a message, a message transfer agent stores the message locally, analyzes its recipients, and either delivers the message locally or routes it to another message transfer agent. The prevalence of undesired electronic mail messages or spam has hindered the entire system of electronic messaging. Many users find that they receive so much undesired electronic mail that it is difficult to sort through and find the desired mail. Systems are available that check for certain key words and quarantine messages with those key words. Despite the existing techniques for controlling spam, however, spam continues to be a major problem in electronic mail systems.

DETAILED DESCRIPTION

Various embodiments may be generally directed to electronic mail systems. More particularly, various embodiments may be directed to various techniques to manage or control electronic mail delivery to reduce receipt of undesired electronic mail and increase receipt of desired electronic mail. This may be accomplished by establishing varying levels of trust for a sender based on stability of the sender over time, and assigning a varying message flow rate to the sender based on a given trust level. For example, the message flow rate for a sender may be increased for higher trust levels and decreased for lower trust levels.

In one embodiment, for example, an electronic mail system may have an internal message transfer agent and an external message transfer agent. The internal message transfer agent may be arranged to determine a message flow rate for an external message transfer agent based on a trust value associated with the external message transfer agent. The trust value may be defined and modified using various time based growth algorithms, such as a linear growth algorithm, a logarithmic growth algorithm, a logistic growth algorithm, and so forth. In this manner, the internal message transfer agent may allow nonlinear variation of message flow rates between various external message transfer agents by rewarding desired behavior and punishing undesired behavior. As a result, a user may realize enhanced products or services. Other embodiments may be described and claimed.

Although some embodiments may be described with reference to electronic mail systems by way of example, it may be appreciated that the concept of trust values and time based growth algorithms may be applied to any system suitable for granting resources based on varying levels of trust. For example, a trusted authority may grant access to certain device or network resources and/or services by increasing trust over time based on the stability of the requesting resource. The embodiments are not limited in this context.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
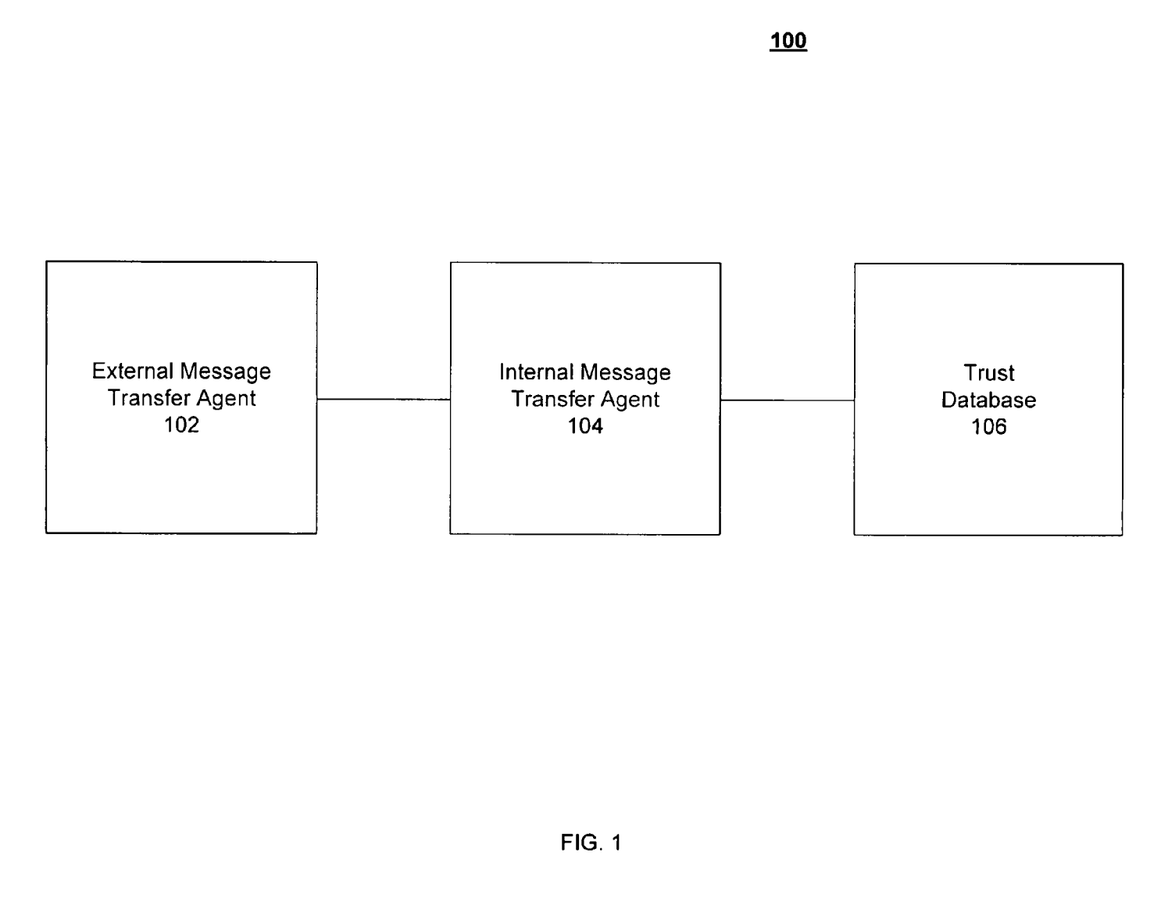
FIG. 1 illustrates one embodiment of a first system.

FIG. 1 illustrates one embodiment of an apparatus. FIG. 1 illustrates a block diagram of a system 100. As shown in FIG. 1, system 100 may comprise multiple elements, such as an external message transfer agent 102, an internal message transfer agent 104, and a trust database 106. The embodiments, however, are not limited to the elements shown in this figure.

In various embodiments, message transfer agents (MTA) 102, 104 may comprise entities arranged to communicate electronic mail messages. MTA 102, 104 may be implemented using hardware elements, software elements, or a combination of both, as desired for a given set of design parameters and performance constraints. Furthermore, MTA 102, 104 may be implemented as part of any number of different networks, systems, devices or components, such as a processor-based system, a computer system, a computer sub-system, a computer, an appliance, a workstation, a terminal, a server, a personal computer (PC), a laptop, an ultra-laptop, a handheld computer, a personal digital assistant (PDA), a set top box (STB), a telephone, a mobile telephone, a cellular telephone, a handset, a smart phone, a tablet computer, a wireless access point, a base station (BS), a subscriber station (SS), a mobile subscriber center (MSC), a radio network controller (RNC), a microprocessor, an integrated circuit such as an application specific integrated circuit (ASIC), a programmable logic device (PLD), a processor such as a general purpose processor, a digital signal processor (DSP) and/or a network processor, an interface, a router, a hub, a gateway, a bridge, a switch, a circuit, a logic gate, a register, a semiconductor device, a chip, a transistor, or any other device, machine, tool, equipment, component, or combination thereof. The embodiments are not limited in this context.

In various embodiments, MTA 102, 104 may be implemented in different devices, respectively, with the devices arranged to communicate over various types of wired or wireless communications media. In one embodiment, for example, external MTA 102 may generally represent a MTA implemented with a first device and arranged to send electronic mail messages to a second device. In one embodiment, for example, internal MTA 104 may generally represent a MTA implemented with a second device and arranged to receive electronic mail messages. Although some embodiments may describe MTA 102, 104 as sending or receiving electronic mail messages by way of example, it may be appreciated that both MTA 102, 104 may be capable of sending and receiving electronic mail messages as desired for a given implementation. Furthermore, it may be appreciated that MTA 102, 104 may be implemented as different components or processes in a single device as well. The embodiments are not limited in this context.

In various embodiments, trust database 106 may be used to store trust values for various MTA, such as external MTA 102, for example. Further multiple attributes may be used to identify and distinguish a given MTA, these distinguishing attributes may include the fully qualified domain name, the network address (e.g., Internet Protocol address) for the MTA, the network address for the device implementing the MTA (e.g., media access control address), and the domain name asserted by the MTA. A trust value may generally represent a level of trust given to a particular MTA. The trust values may be defined and modified based on any number of trust criteria and trust growth algorithms as desired for a given implementation. Examples of trust criteria may include whether the MTA has a fully qualified domain name, the network address (e.g., Internet Protocol address) for the MTA, the network address for the device implementing the MTA (e.g., media access control address), the domain name of the MTA, time in existence for any of the preceding criteria, defined time periods, growth rate constants, saturation rate constants, message flow rates, outside influencers, third party feedback and validation, and so forth. Examples of trust growth algorithms may include a linear growth algorithm, a logarithmic growth algorithm, a logistic growth algorithm, and so forth. In general, the trust values may be generated based on time and past success with a given MTA to establish a basic level of trust. The trust values may be increased or decreased over time to reflect any changes in the level of trust accorded to a given MTA. Specific trust criteria and growth algorithms for various implementations may be described in more detail later.

In general operation, external MTA 102 may send a connection request and/or electronic mail messages to internal MTA 104 over a wired or wireless communications medium. Internal MTA 104 may receive the electronic mail messages, and retrieve a trust value associated with external MTA 102 from trust database 106. Internal MTA 104 may determine whether to accept the connection and assign a message flow rate for external MTA 102 based on the trust value. MTA 102, 104 and corresponding message flows may be described in more detail with reference to FIG. 2.

Figure 2:
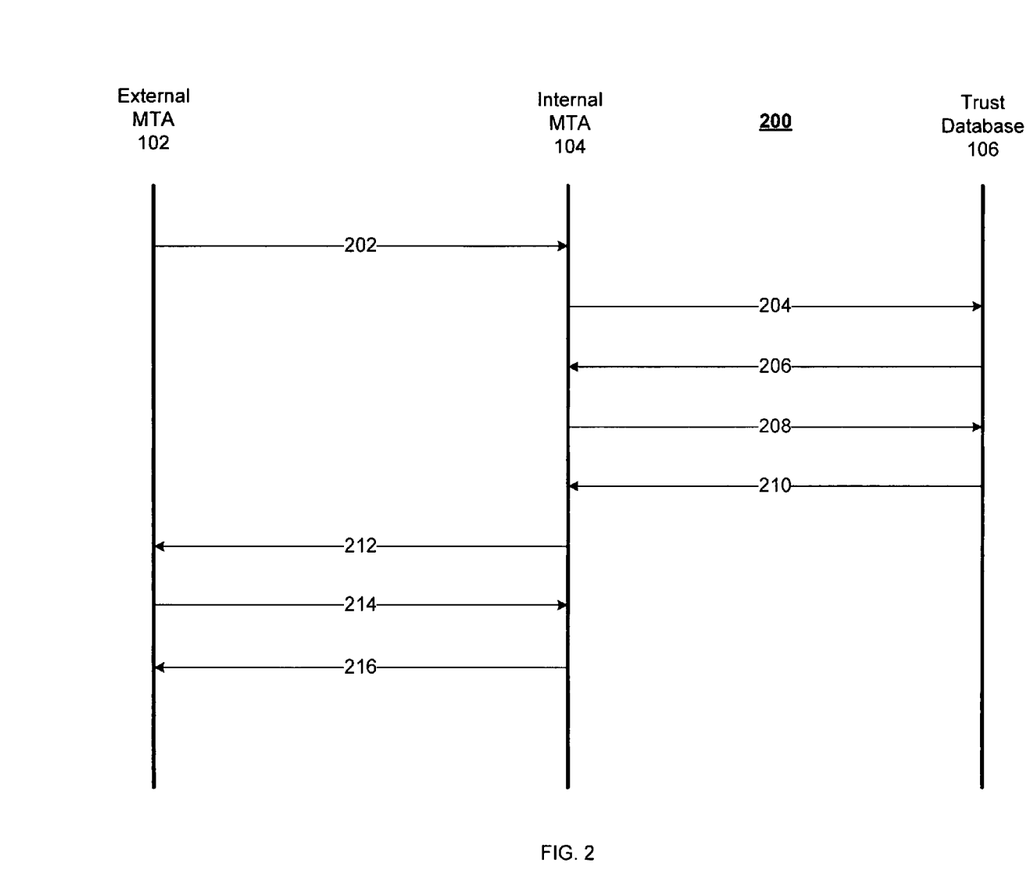
FIG. 2 illustrates a message flow between message transfer agents.

FIG. 2 illustrates a message flow between various message transfer agents. FIG. 2 illustrates a message flow 200 between MTA 102, 104. As shown in FIG. 2, external MTA 102 uses a particular network address (e.g., IP address) to request a connection to internal MTA 104 as indicated at arrow 202. Internal MTA 104 looks up the trust value for external MTA 102 using the fully qualified domain name (FQDN) of external MTA 102, the IP address of the MTA 102, and the domain that it is using to make the connection. This trust value check is indicated by the arrow 204 as a communication from internal MTA 104 to trust database 106. Trust database 106 then indicates (in this specific example) that a trust value does or does not exist as indicated by arrow 206. If there is no connection history then a default value may be used. A connection history entry may be logged to keep track of the number of times that a given external MTA, using a particular IP address and domain, has attempted to access internal MTA 104.

Internal MTA 104 sends a communication back to trust database 106, as indicated by arrow 208, to see if the message delivery threshold has been exceeded for external MTA 102. Each external MTA 102 is assigned a dynamic message delivery threshold value, also referred to herein as a message flow rate value. The dynamic message delivery threshold value may represent a number of access times corresponding to a given trust value that can be made to internal MTA 104. The better the experience with a particular external MTA 102, the progressively higher is its assigned trust value and the greater the message delivery threshold that must be exceeded before connection limitations are imposed.

The message delivery threshold, in this case, may or may not be exceeded and is communicated from trust database 106 to internal MTA 104 as indicated by arrow 210. If the threshold has not been exceeded, internal MTA 104 accepts the connection and if it has been exceeded, other action may be taken. Thus the connection acceptance or rejection is communicated to external MTA 102 as indicated by arrow 212. If the connection is accepted, external MTA 102 may begin transmitting messages to internal MTA 104 as indicated by arrow 214.

Internal MTA 104 continues to track the messages received over time from the MTA 102. As indicated by arrow 216, if internal MTA 104 determines that the message delivery threshold has been exceeded, internal MTA 104 may, for example, drop the connection to external MTA 102 with a temporary error code indicating to retry at a later time.

In some cases, a dialog may occur in which external MTA 102 attempts to retry a connection after a threshold has been exceeded and the connection was refused. External MTA 102 uses its same IP address and domain name to request another connection to internal MTA 104. Internal MTA 104 looks up the trust value for external MTA 102. Again, a trust value exists and a connection history entry is logged. Internal MTA 104 checks to see if the message delivery threshold has been exceeded for external MTA 102. If the message delivery threshold remains exceeded, internal MTA 104 drops the connection to external MTA 102 with a temporary error code thereby indicating to retry at a sufficiently later time.

In some cases, a communication dialog may occur when external MTA 102 retries a connection after the threshold has been exceeded, and the connection is accepted again, but eventually the message delivery threshold is exceeded again. In this case, external MTA 102 uses the same IP address and domain name to again request a connection to internal MTA 104. Internal MTA 104 looks up the trust value for external MTA 102 using the fully qualified domain name of external MTA 102, its IP address, and the domain from which it is connecting. As before, a trust value exists and a connection history entry is logged. Internal MTA 104 checks to see if the message delivery threshold has been exceeded for external MTA 102 and determines that sufficient time has now elapsed since the last rejected connection, and that the threshold has not been exceeded. Internal MTA 104 accepts the connection and receives messages from external MTA 102. Those messages are tracked as received over time. Eventually, internal MTA 104 determines that the message delivery threshold has been exceeded and drops the connection to external MTA 102 with the corresponding error code.

As another example, the trust level may change over time and have an effect on mail delivery. In this case, a time interval has passed with a given external MTA 102 (e.g., as identified by an IP address and domain name) successfully communicating with internal MTA 104 thereby allowing the trust level to increase for external MTA 102. A higher level of trust has been reached and therefore a new trust level is assigned since sufficient time has gone by without any problems occurring. The new trust level allows more messages to be delivered during an allotted time interval.

To implement this new level, external MTA 102 again requests a connection. Internal MTA 104 looks up the trust value for the external MTA using its domain name and IP address and its connecting domain. The new trust value is used to assign a higher message delivery threshold and a connection history entry is logged. Internal MTA 104 checks to see if the new message delivery threshold has been exceeded for external MTA 102. Since it has not been exceeded, internal MTA 104 accepts the connection. External MTA 102 transmits messages to internal MTA 104, and internal MTA 104 tracks those messages as received over a given time period. An increased message delivery rate may be allowed based on the new trust level. Eventually, internal MTA 104 determines that the message delivery threshold has been exceeded, drops the connection, and issues a temporary error code indicating to retry at a later time.

As yet another example, the trust level may be influenced by a so-called outside trust influencer. Examples of outside trust influencers may be ratings assigned by rating agencies, white lists, or information received from others about the trust value of a given external MTA 102. In this case, an outside trust influencer may use spam history or other data to determine that the trust value for a given MTA should be changed. For example, the outside trust influencer may determine that external MTA 102 is a known spammer. This would lower its trust value. New inquiries for the trust value for external MTA 102 return the new trust value. In other words, trust database 106 may be loaded with new data from external sources other than the actual history of transactions between external MTA 102 and internal MTA 104.

It can be appreciated from message flow 200 that internal MTA 104 limits the number and frequency with which the MTA 102 may make connections until internal MTA 104 gets to generally "know" a given external MTA 102. Internal MTA 104 uses a form of trust based on past history and potentially outside influencers to assume varying degrees of trust. Any time a new domain attempts an inbound communication, it must pay a price of message delay by incurring a limit on the number and rate at which the new domain can send messages to internal MTA 104. A new external MTA 102 for a known domain may also incur a penalty message delay by having a limit on the message flow rate at which they can send messages to internal MTA 104. Over time, the longer the domain exists and the longer external MTA 102 retains the same name and address, the more it is trusted. The increase in trust may allow external MTA 102 to send more mail to internal MTA 104.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 3:
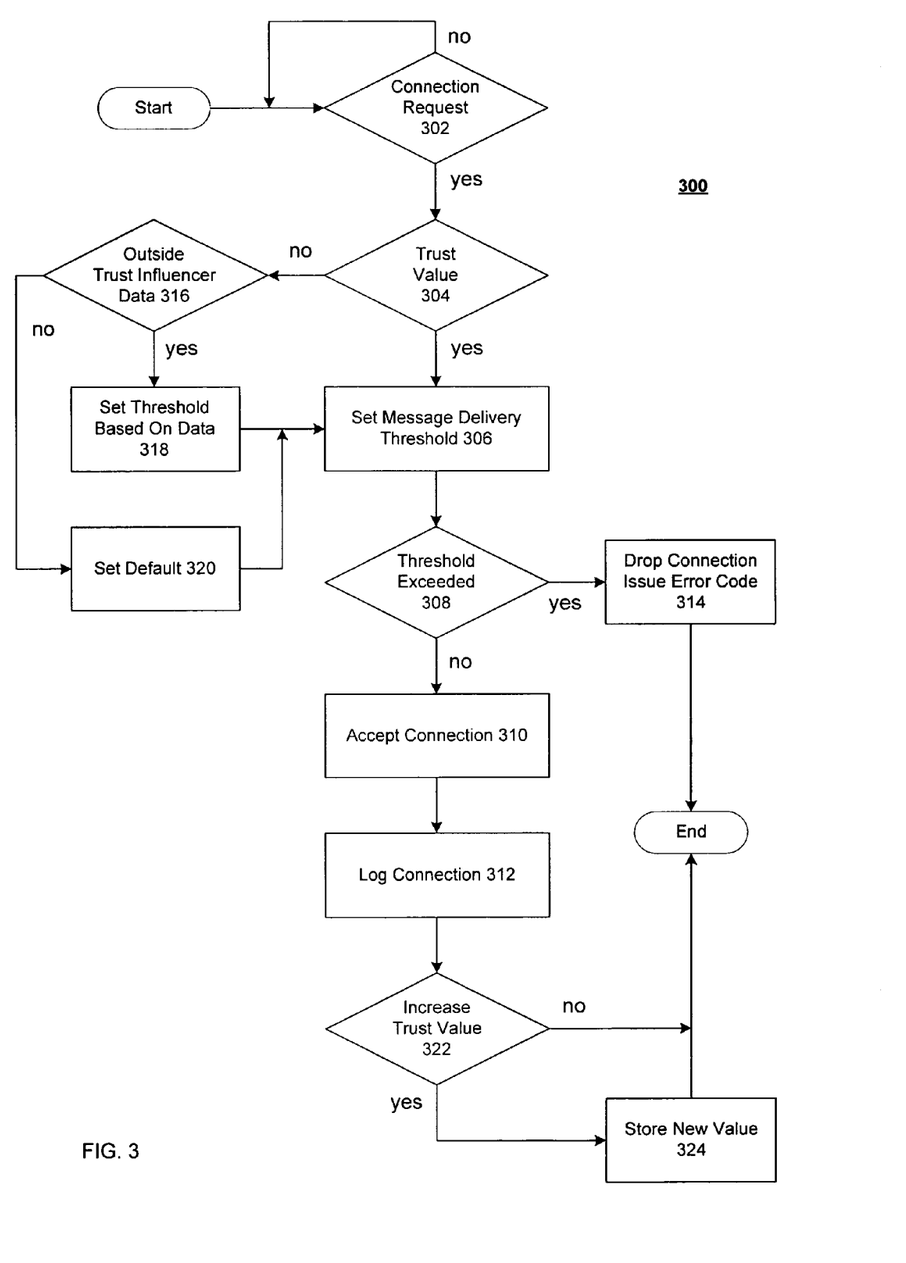
FIG. 3 illustrates one embodiment of a first logic diagram.

FIG. 3 illustrates one embodiment of a logic flow. FIG. 3 illustrates a logic flow 300. Logic flow 300 may be representative of the operations executed by one or more embodiments described herein, such as internal MTA 104, for example. As shown in logic flow 300, internal MTA 104 begins by determining whether a connection request or message was received as indicated at diamond 302. Internal MTA 104 checks to determine whether there exists a trust value for the connecting external MTA 102 as indicated at diamond 304. If there is a trust value, a message delivery threshold is set as indicated at block 306. Then, in the course of communications with the external MTA 102, internal MTA 104 checks to determine whether the message delivery threshold has been exceeded at diamond 308. As long as it is not exceeded, new connections may be accepted, as indicated in block 310, but those connections and the messages transmitted are logged, as indicated at 312, and counted. This count of connections and messages is used to determine when the number of connections and/or the rate of connection and message thresholds are exceeded in diamond 308. When the threshold is exceeded, the connection may be dropped and an error code is issued as indicated in block 314.

Referring again to diamond 304, if there is no trust value, a check may be made to determine whether outside trust influencer data exists as indicated at diamond 316. If so, the threshold may be set based on that data. The data may be further stored in trust database 106 as indicated in block 318. If there is no outside influencer data then a default value may be set as indicated at block 320. The default value may allow a relatively limited number of connections or messages over time, and the value may be increased based on performance and time.

After the connection is logged, a check at diamond 322 determines whether the trust value should be increased based on the connection history, as well as other trust criteria as discussed further below. If the trust value is increased, internal MTA 104 may allow a higher number of messages to be transmitted from external MTA 102 before the message delivery threshold is reached. The new message delivery threshold value may then be stored as indicated in block 324.

Defining or modifying a trust value at diamond 322 may be accomplished using a number of different trust criteria, some of which are based on time. One example of trust criteria may include a domain existence value. The domain existence value may represent an amount of time a given domain has been in existence. A given domain may be identified using a fully qualified domain name, for example. Another example of trust criteria may include a sender existence value. The sender existence value may represent an amount of time a given sender has been in existence. A given sender may be identified using an IP address, for example. Yet another example of trust criteria may include a message flow rate value. The message flow rate value may represent a number of messages accepted from a given sender within a given time period, and may be used to set the message delivery threshold value. These trust criteria are provided by way of example only, and more or less trust criteria may be used as desired for a given implementation. Each trust criteria defined for a given implementation may have a threshold value associated with it. Internal MTA may compare a current value with the respective threshold value to determine a given trust level value. The defining or modifying of a trust level may be described in more detail with reference to FIG. 4.

Figure 4:
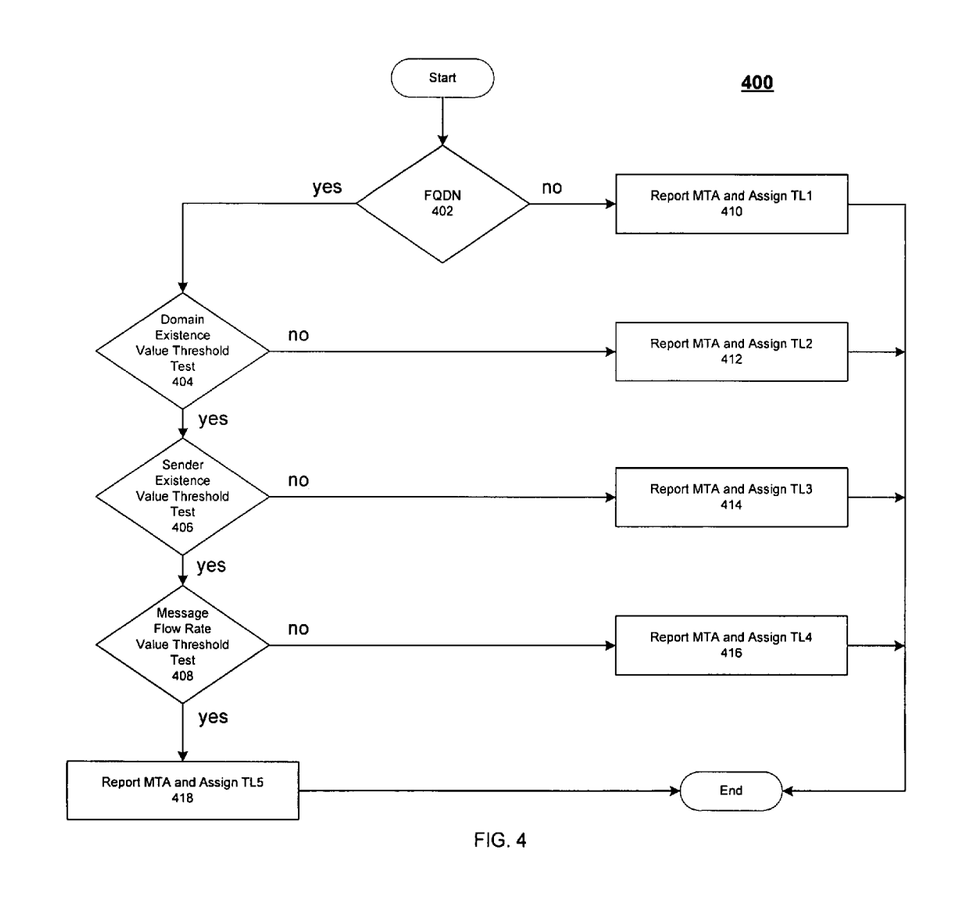
FIG. 4 illustrates one embodiment of a second logic diagram.

FIG. 4 illustrates one embodiment of a second logic flow. FIG. 4 illustrates a logic flow 400. Logic flow 400 may be representative of operations to assign a trust level to a given MTA, such as performed during diamond 322 of logic flow 300, for example. Logic flow 400 may assign varying levels of trust to an MTA (e.g., TL1-TLm), with the higher trust levels allowing a corresponding higher message flow rate for the MTA.

As shown in FIG. 4, a determination may be made whether external MTA 102 has a FQDN at block 402. If external MTA 102 does not have a FQDN at block 402, external MTA 102 may be reported and assigned a trust level 1 (TL1) at block 410. If external MTA 102 does have a FQDN at block 402, a determination may be made whether external MTA 102 has a current domain existence value that exceeds a domain existence threshold value at block 404. If external MTA 102 does not have a current value that exceeds the threshold value at block 404, external MTA 102 may be reported and assigned a trust level 2 (TL2) at block 412. If external MTA 102 does have a current value that exceeds the threshold value at block 404, a determination may be made whether external MTA 102 has a current sender existence value that exceeds a sender existence threshold value at block 406. If external MTA 102 does not have a current value that exceeds the threshold value at block 406, external MTA 102 may be reported and assigned a trust level 3 (TL3) at block 414. If external MTA 102 does have a current value that exceeds the threshold value at block 406, a determination may be made whether external MTA 102 has a current message flow rate value that exceeds (or alternatively possibly within) a message flow rate threshold value at block 408. If external MTA 102 does not have a current value that exceeds the threshold value at block 408, external MTA 102 may be reported and assigned a trust level 4 (TL4) at block 416. If external MTA 102 does have a current value that exceeds the threshold value at block. 408, external MTA 102 may be reported and assigned a trust level 5 (TL5) at block 418. Although message flow 400 is shown with five trust levels, it may be appreciated that any number of trust levels may be implemented using additional trust criteria as desired for a given implementation.

In various embodiments, the varying trust levels TL1-TLm may have corresponding message flow rates assigned to each trust level. The corresponding message flow rate may be defined or modified in accordance with a number of different trust growth algorithms. The trust growth algorithms may be generally classified as linear and non-linear growth algorithms. Both classes of growth algorithms attempt to limit the flow rate of a new MTA using a time the new MTA remains stable as the criterion for increasing trust. Various embodiments of trust growth algorithms may be described in more detail with reference to FIGS. 5 and 6.

Figure 5:
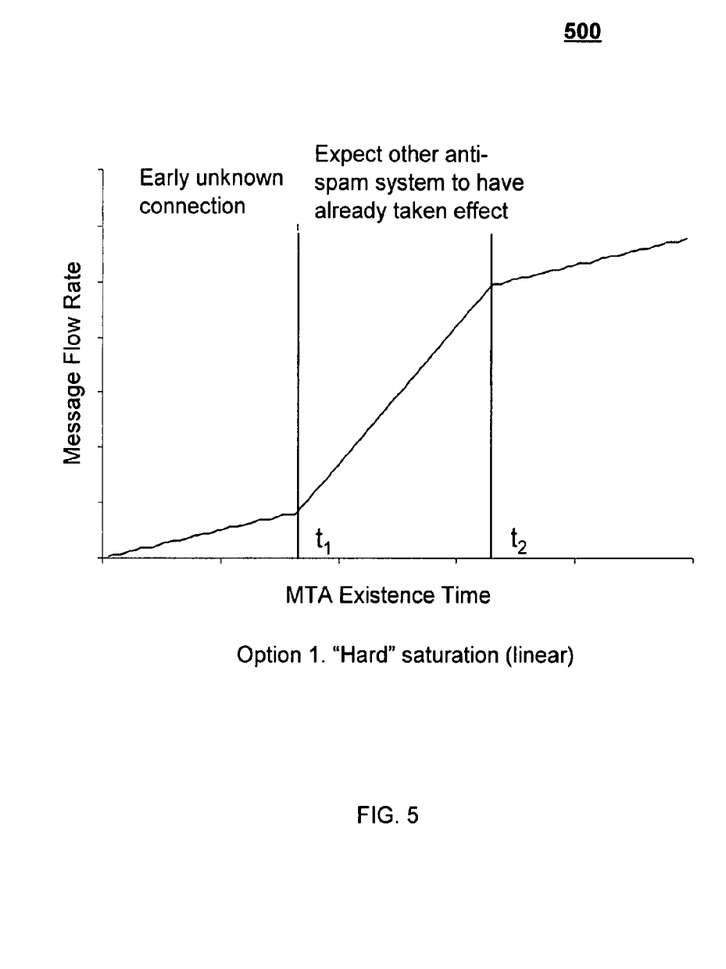
FIG. 5 illustrates one embodiment of a first chart.

FIG. 5 illustrates one embodiment of a first chart. FIG. 5 illustrates a chart 500 have a trust growth curve generated using a linear growth algorithm. Chart 500 includes message flow rate values on the y-axis and existence time for an MTA on the x-axis. Since the axis may use relative values, assume the MTA existence time can be in the order of hours, and message flow rate is the number of messages accepted per hour which can be defined based on specific implementations. Further assume an electronic mail system accepts 5 messages per hour for the first hour on all new MTA, and increases the message flow rate every hour. As shown for chart 500, for each MTA the linear algorithm first allows a slow increase of trust level and consequently a small increase in message flow rate. After a certain time period of time if the MTA stays stable the system will allow a faster rate of increase in trust level and consequently more messages will be accepted from this MTA. Eventually, the system will allow the trust level of the MTA to saturate at a value where little or no penalties need to be applied. In other words, the MTA reaches a "trusted" level where all messages from this MTA will be accepted after maintaining stability over a certain period of time.

In various embodiments, internal MTA 104 may use a linear growth algorithm to assign trust levels and corresponding message flow rates to external MTA 102. For example, some or all of the following defined variables (where all values are positive) may be used by the linear growth algorithm:

t—MTA existence time (variable);
$t_1$—Time period when a new MTA is considered "early unknown" (constant);
$t_2$—Cutoff time when the message flow rate reaches a set limit (the MTA reaches the "Trusted" status),
$\{d_1, d_2, d_3, d_4, d_5, d_6\}$—curve shape values (slope, growth rate—constants);
n—Malthusian parameter (saturation rate—constant); and
Min_Flow_Rate—minimum number of messages allowed for all new MTA (constant).

All constant values above may be configured manually by a user (e.g., an email system administrator) or automatically by internal MTA 104.

In the linear growth algorithm, a length of time an external MTA needs to remain stable before internal MTA 102 considers external MTA trustworthy may be predefined. An example of a linear growth algorithm may be expressed as follows in Equation (1):

$$\text{Message Flow Rate} = \begin{cases} \text{Min Flow Rate} + t \times d_1, & 0 \leq t < t_1 \\ \text{Min Flow Rate} + t_1 \times (d_1 - d_2) + t \times d_2, & t_1 \leq t < t_2 \\ \text{Min Flow Rate} + t_1 \times (d_1 - d_2) + t_2 \times (d_2 - d_3) + t \times d_3, & t_2 \leq t \end{cases} \quad (1)$$

In Equation (1), $t_1$ and $t_2$ may represent user-defined values. As shown in chart 500, Equation (1) may generate a trust growth curve that leads to a "hard" saturation value. For a new external MTA the linear algorithm first allows a slow increase of trust level and consequently a small increase in message flow rate between time zero $t_0$ and $t_1$. This is because messages from new external MTA should be allowed at some nominal lower acceptance rate to avoid undue punishment to legitimate senders. After a certain predefined amount of time internal MTA 104 may allow a faster rate of increase in trust level and consequently more messages will be accepted from this MTA. For example, the linear algorithm provides for a linear growth in message flow rate between time periods $t_1$ and $t_2$. Eventually at time period $t_2$, internal MTA 104 may allow the trust level of external MTA 102 to saturate at a value where few if any delay penalties are applied. The saturation point represents a fully trusted level where all messages from external MTA 102 will be accepted after maintaining stability over a certain period of time.

Figure 6:
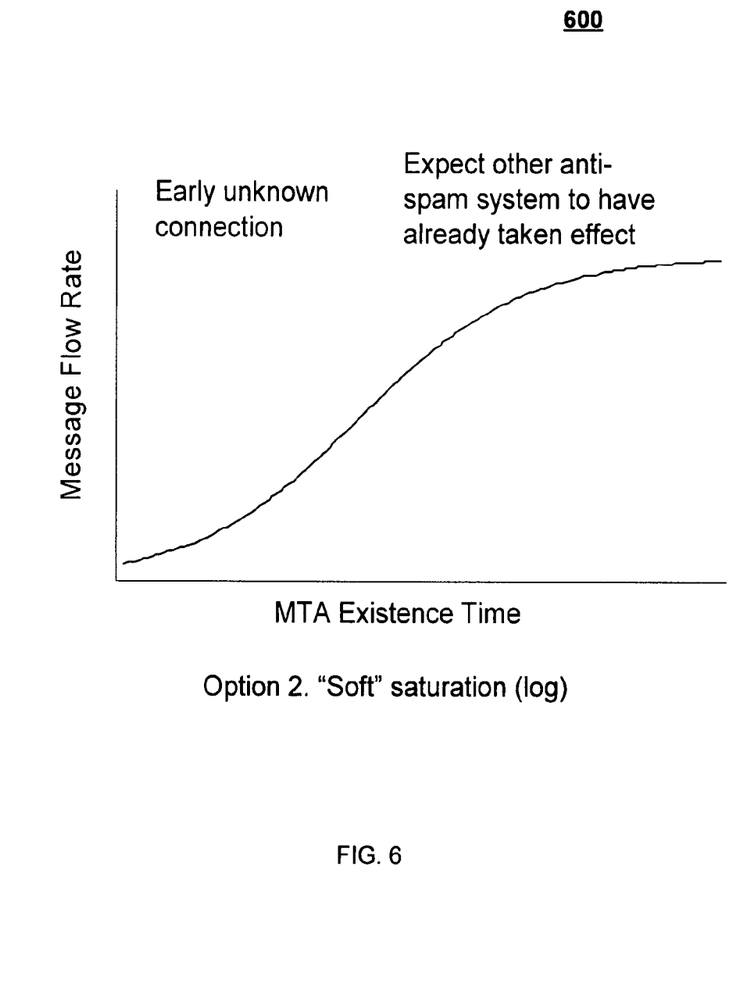
FIG. 6 illustrates one embodiment of a second chart.

FIG. 6 illustrates one embodiment of a second chart. FIG. 6 illustrates a chart 600 have a trust growth curve generated using one or more non-linear growth algorithms. Using the same assumptions as given with respect to the linear growth algorithm described with reference to FIG. 5, chart 600 illustrates a trust growth curve generated using a logarithmic growth algorithm and/or a logistic growth algorithm.

In various embodiments, internal MTA 104 may use a logarithmic growth algorithm to assign trust levels and corresponding message flow rates to external MTA 102. An example of a logarithmic growth algorithm may be expressed using Equation (2) as follows:

$$\text{Message\_Flow\_Rate}(t) = \text{Min\_Flow\_Rate} \times (1 + d_4 \times \log(t)) \quad (2)$$

where $d_4$ represents a curve shape value (e.g., slope, growth rate constants). In the logarithmic growth algorithm shown in Equation (2), the growth rate of message flow follows a logarithmic growth curve. When an external MTA 102 becomes trustworthy depends on the natural saturation of the curve.

In various embodiments, internal MTA 104 may use a logistic growth algorithm to assign trust levels and corresponding message flow rates to external MTA 102. An example of a logistic growth algorithm may be expressed using Equation (3) as follows:

$$\text{Message\_Flow\_Rate}(t) = \text{Min\_Flow\_Rate} \times \frac{d_5}{1 + d_6 \times e^{-nt}} \quad (3)$$

where n is a Malthusian parameter (e.g., saturation rate constant). Similar to the logarithmic growth algorithm of Equation (2), in the logistic growth algorithm of Equation (3), the growth rate of message flow follows a logistic growth curve, and when the MTA becomes trustworthy depends on the natural saturation of the curve.

The linear and non-linear growth algorithms have various advantages and disadvantages. For example, the linear growth algorithm may allow more control on when a new MTA should be trusted since $t_1$ and $t_2$ can be predefined, at the potential cost of being more predictable by spammers. In another example, the non-linear growth algorithms may allow the message flow rate to grow and saturate more gradually and in a nonlinear fashion, at the potential cost of allowing less "cut-off" control by the user. This may be somewhat mitigated, however, since the shape of the trust growth curve can be adjusted by changing some of the constants. In both algorithms, the MTA existence time (t) can be adjusted based on outside influencers as previously described with reference to message flow 200 and logic flow 300, such as a white list, feedback provided by an independent anti-spam system, administrative override, and so forth.

Figure 7:
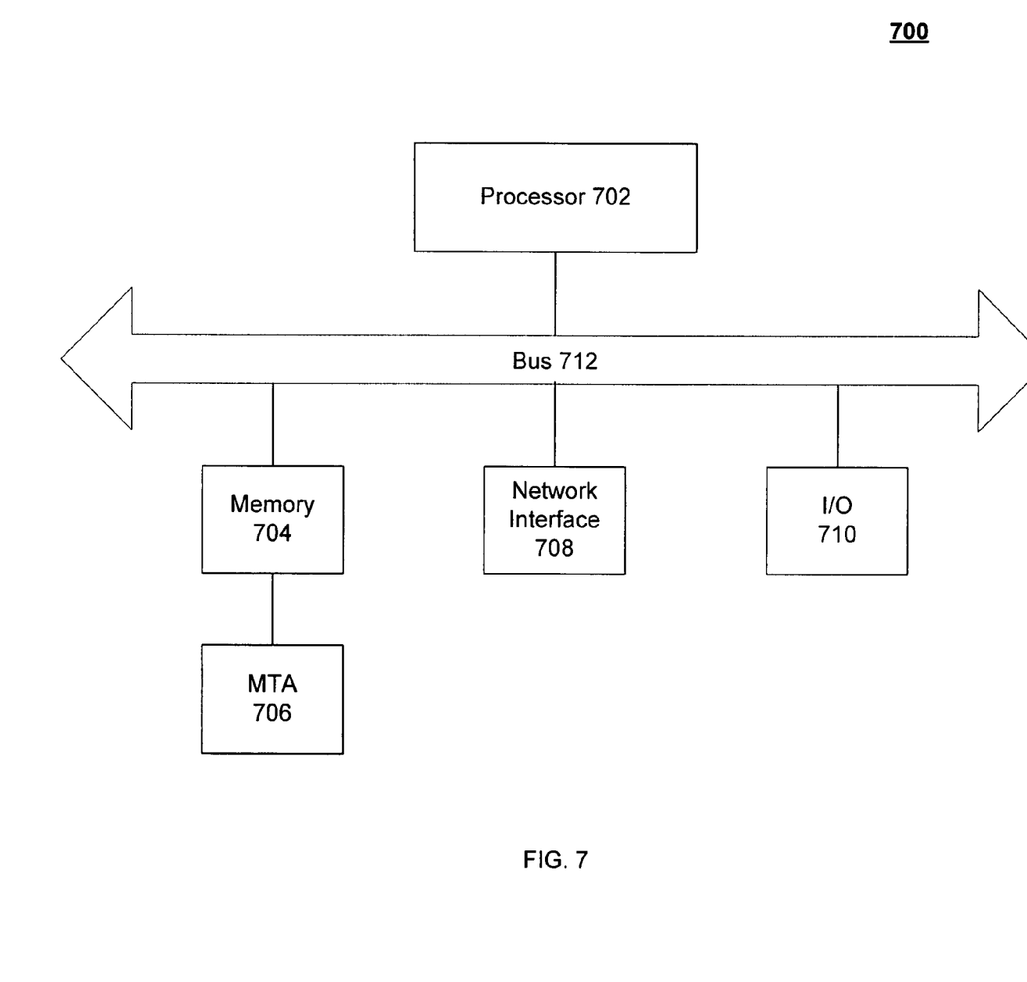
FIG. 7 illustrates one embodiment of a second system.

FIG. 7 illustrates one embodiment of a system. FIG. 7 illustrates a system 700. System 700 may be representative of a system or architecture suitable for use with one or more embodiments described herein, such as MTA 102 and/or 104, for example. As shown in FIG. 7, system 700 may comprise a processor-based system including a processor 702 coupled by a bus 712 to a memory 704, network interface 708, and an input/output (I/O) interface 710. Memory 704 may be further coupled to an MTA 706. More or less elements may be implemented for system 700 as desired for a given implementation.

In various embodiments, processor 702 may represent any suitable processor or logic device, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, processor 702 may be implemented as a general purpose processor, such as a processor made by Intel® Corporation, Santa Clara, Calif. Processor 702 may also be implemented as a dedicated processor, such as a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), and so forth. The embodiments, however, are not limited in this context.

In one embodiment, memory 704 may represent any machine-readable or computer-readable media capable of storing data, including both volatile and non-volatile memory. For example, memory 704 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 704 may be included on the same integrated circuit as processor 702. Alternatively some portion or all of memory 704 may be disposed on an integrated circuit or other medium, for example a hard disk drive, that is external to the integrated circuit of processor 702, and processor 702 may access memory 704 via bus 712. The embodiments are not limited in this context.

In various embodiments, system 700 may include network interface 708. System 700 may be implemented as a wireless device, a wired device, or a combination of both. When implemented as a wireless device, network interface 708 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired device, network interface 708 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

In various embodiments, I/O 710 may include any desired input and output elements that may be accessible or shared by elements of system 700, such as a keyboard, a mouse, navigation buttons, dedicated hardware buttons or switches, a camera, a microphone, a speaker, voice codecs, video codecs, audio codecs, a display, a touch screen, and so forth. The embodiments are not limited in this context.

In various embodiments, MTA 706 may represent one or both MTA 102, 104. In one embodiment, for example, MTA 706 may be software suitable for executing by a general purpose processor or special purpose processor, such as processor 702. MTA 706 may also be implemented by hardware, or a combination of hardware and software, as desired for a given implementation. The embodiments are not limited in this context.

In summary, some embodiments may be effective against hit and run tactics because they use time and past success to establish a basic form of trust. Some embodiments may allow nonlinear variation of the change in message flow rate between new corners and trustworthy MTA. Some embodiments may not need any other infrastructure support. In addition, some embodiments may develop a list of records that is dynamic and, therefore, contains less waste records. Legitimate message transfer agents are not severely punished because the algorithm allows decaying levels of punishment over time. Once the MTA becomes trusted, all senders using the MTA may benefit from that trust. Some embodiments may reward stability. If an MTA exists for a sufficient length of time with a consistent name and IP address, it continues to get consistently higher levels of trust without penalty. Some embodiments may work with other outside influencers to accelerate decision making. In some embodiments, to prevent a small number of spam messages from being delivered to a very large distribution list, a receiving MTA may count each recipient as a separate message delivery in the count of messages allowed within a given time period. In some embodiments, to prevent very large unwanted messages from loading the system, a receiving MTA may count the size of the delivered messages and limit the amount of data received within a given time period.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus, comprising:
 a memory;
 a processor; and
 an internal message transfer agent coupled to the processor, the internal message transfer agent operative to:
 receive an electronic mail message from an external message transfer agent;
 retrieve a trust value associated with said external message transfer agent; determine a message delivery threshold for said external message transfer agent based on said trust value;
 determine that a current message flow rate value for said external message transfer agent does not exceed said message delivery threshold;
 accept the electronic mail message based on the current message flow rate value not exceeding the message delivery threshold; and
 increase said trust value in accordance with a growth rate in which a fully trusted level occurs at a saturation point, wherein the growth rate follows a logistic growth algorithm and the growth rate is based on one or both of a domain existence value and a sender existence value, the domain existence value representing an amount of time that a domain of the external message transfer agent has been in existence, the sender existence value representing an amount of time that a network address of the external message transfer agent has been in existence.

2. The apparatus of claim 1, said internal message transfer agent operative to decrease said trust value based on a number of messages received within a given time period.

3. A system, comprising:
 a memory;
 a processor;
 a wireless communications interface coupled to the processor; and an internal message transfer agent coupled to the processor, said internal message transfer agent operative to:

receive an electronic mail message from an external message transfer agent;

retrieve a trust value associated with said external message transfer agent; determine a message delivery threshold for said external message transfer agent based on said trust value;

determine that a current message flow rate value for said external message transfer agent does not exceed said message delivery threshold;

accept the electronic mail message based on the current message flow rate value not exceeding the message delivery threshold; and increase said trust value in accordance with a growth rate in which a fully trusted level occurs at a saturation point, wherein the growth rate follows a logistic growth algorithm and the growth rate is based on one or both of a domain existence value and a sender existence value, the domain existence value representing an amount of time that a domain of the external message transfer agent has been in existence, the sender existence value representing an amount of time that a network address of the external message transfer agent has been in existence.

4. The system of claim 3, said internal message transfer agent operative to decrease said trust value based on a number of messages received within a given time period.

5. A method, comprising:

receiving an electronic mail message from an external message transfer agent;

retrieving a trust value associated with said external message transfer agent;

determining a message delivery threshold for said external message transfer agent based on said trust value;

determining that a current message flow rate value for said external message transfer agent does not exceed said message delivery threshold;

accepting the electronic mail message based on the current message flow rate value not exceeding the message delivery threshold; and increasing said trust value in accordance with a growth rate in which a fully trusted level occurs at a saturation point, wherein the growth rate follows a logistic growth algorithm and the growth rate is based on one or both of a domain existence value and a sender existence value, the domain existence value representing an amount of time that a domain of the external message transfer agent has been in existence, the sender existence value representing an amount of time that a network address of the external message transfer agent has been in existence.

6. An article comprising a machine-readable medium, wherein the machine-readable medium is not a signal, the machine-readable medium containing instructions that if executed enable a system to:

receive an electronic mail message from an external message transfer agent;

retrieve a trust value associated with said external message transfer agent;

determine a message delivery threshold for said external message transfer agent based on said trust value;

determine that a current message flow rate value for said external message transfer agent does not exceed said message delivery threshold;

accept the electronic mail message based on the current message flow rate value not exceeding the message delivery threshold; and increase said trust value in accordance with a growth rate in which a fully trusted level occurs at a saturation point, wherein the growth rate follows a logistic growth algorithm and the growth rate is based on one or both of a domain existence value and a sender existence value, the domain existence value representing an amount of time that a domain of the external message transfer agent has been in existence, the sender existence value representing an amount of time that a network address of the external message transfer agent has been in existence.

* * * * *